(12) United States Patent
Antonijevic et al.

(10) Patent No.: US 8,401,293 B2
(45) Date of Patent: Mar. 19, 2013

(54) WORD RECOGNITION OF TEXT UNDERGOING AN OCR PROCESS

(75) Inventors: Aleksandar Antonijevic, Bellevue, WA (US); Ivan Mitic, Bellevue, WA (US); Mircea Cimpoi, Belgrade (RS); Djordje Nijemcevic, Beograd (RS)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 12/772,376

(22) Filed: May 3, 2010

(65) Prior Publication Data

US 2011/0268360 A1 Nov. 3, 2011

(51) Int. Cl.
*G06K 9/00* (2006.01)
(52) U.S. Cl. ........................ 382/177; 382/229
(58) Field of Classification Search .................. None
See application file for complete search history.

(56) References Cited

U.S. PATENT DOCUMENTS

| | | | |
|---|---|---|---|
| 5,577,135 A | 11/1996 | Grajski et al. | |
| 6,108,444 A | 8/2000 | Syeda-Mahmood | |
| 6,154,579 A | 11/2000 | Goldberg | |
| 6,944,340 B1 | 9/2005 | Shah | |
| 6,993,205 B1 | 1/2006 | Lorie et al. | |
| 7,171,061 B2 | 1/2007 | Sarkar et al. | |
| 7,724,957 B2 * | 5/2010 | Abdulkader | 382/186 |
| 2005/0259866 A1 | 11/2005 | Jacobs et al. | |
| 2009/0169131 A1 | 7/2009 | Nestares et al. | |
| 2011/0274354 A1* | 11/2011 | Nijemcevic | 382/177 |

OTHER PUBLICATIONS

Casey et al. (Jul. 1996) "A survey of methods and strategies in character segmentation." IEEE Trans. on Pattern Analysis and Machine Intelligence, vol. 18 No. 7, pp. 690-706.*
Liang et al. (1994) "Segmentation of touching characters in printed document recognition." Pattern Recognition, vol. 27 No. 6, pp. 825-840.*
Saba et al. (Jun. 2010) "A survey on methods and strategies on touched characters segmentation." Int'l J. Research and Reviews in Computer Science, vol. 1 No. 2, pp. 103-114.*
Tsujimoto et al. (Jul. 1992) "Major components of a complete text reading system." Proc. IEEE, vol. 80 No. 7, pp. 1133-1149.*
Wang et al. (2001) "Multi-branch and two-pass HMM modeling approaches for off-line cursive handwriting recognition." Proc. 6$^{th}$ Int'l Conf. on Document Analysis and Recognition, pp. 231-235.*
Wang, et al., "Multi-Branch and Two-Pass HMM Modeling Approaches for Off-Line Cursive Handwriting Recognition", Retrieved at << http://ieeexplore.ieee.org/stamp/stamp.jsp?tp=&arnumber=953789&isnumber=20622 >>, Proceedings. Sixth International Conference on Document Analysis and Recognition, 2001, pp. 231-235.
Viikki, et al., "A Confidence Measure for Detecting Recognition Errors in Isolated Word Recognition", Retrieved at <<http://www.karilaurila.com/Publications/6.doc >>, SST96, Dec. 1996, pp. 6.

* cited by examiner

*Primary Examiner* — Barry Drennan
(74) *Attorney, Agent, or Firm* — Mayer & Williams PC

(57) ABSTRACT

A method for identifying words in a textual image undergoing optical character recognition includes receiving a bitmap of an input image which includes textual lines that have been segmented by a plurality of chop lines. The chop lines are each associated with a confidence level reflecting a degree to which the respective chop line properly segments the textual line into individual characters. One or more words are identified in one of the textual lines based at least in part on the textual lines and a first subset of the plurality of chop lines which have a chop line confidence level above a first threshold value. If the first word is not associated with a sufficiently high word confidence level, at least a second word in the textual line is identified based at least in part on a second subset of the plurality of chop lines which have a confidence level above a second threshold value lower than the first threshold value.

20 Claims, 4 Drawing Sheets

*(A Word Split by Chop Lines)*

*(A Few Character Candidates Obtained for the Chop Lines in Figure 2)*

WORD RECOGNITION OF TEXT UNDERGOING AN OCR PROCESS

BACKGROUND

Optical character recognition (OCR) is a computer-based translation of an image of text into digital form as machine-editable text, generally in a standard encoding scheme. This process eliminates the need to manually type the document into the computer system. A number of different problems can arise due to poor image quality, imperfections caused by the scanning process, and the like. For example, a conventional OCR engine may be coupled to a flatbed scanner which scans a page of text. Because the page is placed flush against a scanning face of the scanner, an image generated by the scanner typically exhibits even contrast and illumination, reduced skew and distortion, and high resolution. Thus, the OCR engine can easily translate the text in the image into the machine-editable text. However, when the image is of a lesser quality with regard to contrast, illumination, skew, etc., performance of the OCR engine may be degraded and the processing time may be increased due to processing of all pixels in the image. This may be the case, for instance, when the image is obtained from a book or when it is generated by an imager-based scanner, because in these cases the text/picture is scanned from a distance, from varying orientations, and in varying illumination. Even if the performance of the scanning process is good, the performance of the OCR engine may be degraded when a relatively low quality page of text is being scanned.

One step in the OCR process is word recognition. The recognized words are intended to correspond exactly, in spelling and in arrangement, to the words printed on the original document. Such exact correspondence, however, can be difficult to achieve. As a result, the electronic document may include misrecognized words that never appeared in the original document. For purposes of this discussion, the term "word" covers any set of characters, whether or not the set of characters corresponds to an actual word of a language. Moreover, the term "word" covers sets of characters that include not only letters of the alphabet, but also numbers, punctuation marks, and such typographic symbols as "$", "&", "#", etc. Thus, a misrecognized word may comprise a set of characters that does not comprise an actual word, or a misrecognized word may comprise an actual word that does not have the same spelling as that of the corresponding word in the scanned document. For example, the word "got" may be misrecognized as the non-existent word "qot", or the word "eat" may be recognized as "cat." Such misrecognized words, whether they comprise a real word or a mere aggregation of characters, may be quite close in spelling to the words of the original document that they were intended to match. The cause of such misrecognition errors includes the OCR performance problems discussed above. In addition, misrecognition errors arise from the physical similarities between certain characters. For example, as discussed above, such errors may occur when the letter "g" is confused with the physically similar letter "q". Another common error that OCR algorithms make is confusing the letter "d" with the two-letter combination of "ol."

SUMMARY

The speed and accuracy of a word recognition process employed by optical character recognition (OCR) engine may be compromised because of the large amount of input data that may undergo processing. Such input data may include, for example, a relatively large number of candidate characters that have been recognized in a textual line of a textual image. Each candidate character, which generally has a different confidence level associated with it, may or may not represent an actual character. Various permutations of these candidate characters are examined during a word search portion of the word recognition process in order to identify a word or words that those characters most likely represent.

In one implementation, a word recognition apparatus and method operates in a multi-pass mode. In this approach the word search component first uses input data elements (e.g. candidate characters) with the highest confidence levels in the first pass and attempt to identify words. If the word recognition fails, the word search component performs a second pass using input data elements with a lower confidence level. This process may be repeated for additional passes until the word is properly recognized. This approach can significantly improve recognition performance and accuracy since less data and noise (data with lower confidence levels) needs to be processed.

In one implementation, in addition to using different input data elements with different threshold confidence levels during each pass, different character recognition and word search algorithms may be used. For instance, faster or less accurate algorithms may be used during earlier passes (e.g, the first and second passes) while slower and more accurate algorithms may be used in subsequent passes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
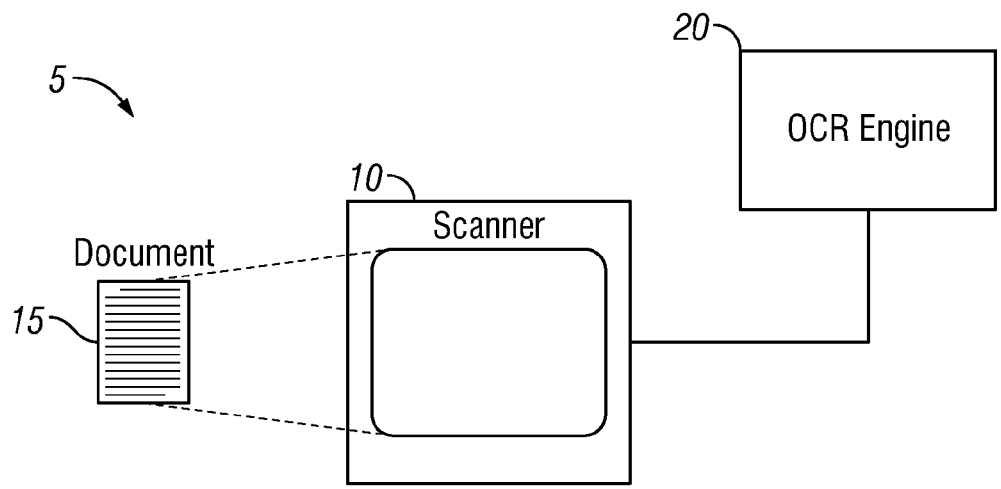
FIG. 1 shows one illustrative example of a system for performing optical character recognition (OCR) of a textual image.

FIG. 1 shows one illustrative example of a system 5 for performing optical character recognition (OCR) of a textual image. The system 5 includes a data capture arrangement (e.g., a scanner 10) that generates an image of a document 15. The scanner 10 may be an imager-based scanner which utilizes a charge-coupled device as an image sensor to generate the image. The scanner 10 processes the image to generate input data, and transmits the input data to a processing arrangement (e.g., an OCR engine 20) for character recognition within the image. In this particular example the OCR engine 20 is incorporated into the scanner 10. In other examples, however, the OCR engine 20 may be a separate unit such as stand-alone unit or a unit that is incorporated into another device such as a PC, server, or the like.

Figure 2:
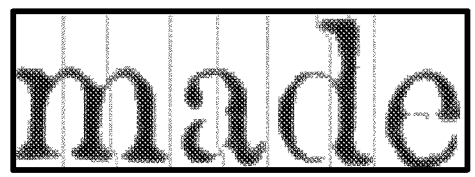
FIG. 2 shows a portion of a textual line that has been over-segmented by chop lines.

The OCR engine 20 receives a textual image as a bitmap of text lines. One component of the OCR engine 20 segments each textual line with a series of chop lines that are located between adjacent characters. Ideally, a single symbol or glyph is located between pair of adjacent chop lines. In many cases, however, it is difficult to segment words into individual symbols due to poor image quality, font weight, italic text, character shape, etc. This problem can be avoided by over-segmenting rather than under-segmenting. That is, more symbols or glyphs are produced than are likely to represent actual characters in the image. FIG. 2 shows the results of over-segmenting a portion of a textual line. In this example the character "m" is divided into three symbols, the characters "a" and "d" are each divided into two symbols and the character "e" is divided into a single symbol.

Figure 3:
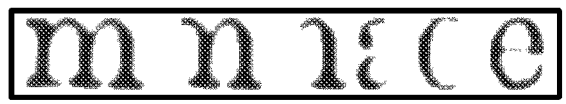
FIG. 3 shows a few candidate characters that are produced by an ICR component for the symbols shown in FIG. 2.

After the character chopper component creates the individual symbols, an individual character recognizer (ICR) component attempts to identify the character each symbol or combination of symbols represents. The ICR component produces a series of candidate characters along with a confidence level for each one. FIG. 3 shows a few candidate characters that are produced by an ICR component for the symbols shown in FIG. 2.

Once the candidate characters have been produced a word search component attempts to identify the most likely word they represent by grouping candidate characters in different ways. Since there may be many ways that individual symbols may be combined, and many candidate characters that may be produced for each such symbol, all of which is used as an input data element by the word search component, the speed and accuracy of the word search component can be compromised. Ideally, the quantity of input data to the word search component of the OCR engine would be reduced.

As detailed below, a word recognition system operates in a multi-pass mode. In this approach the word search component in the system first uses input data elements with the highest confidence levels in the first pass and attempt to identify words. If the word recognition fails, the word search component performs a second pass using input data elements with a lower confidence level. This process may be repeated for additional passes until the word is properly recognized. This approach can significantly improve recognition performance and accuracy since less data and noise (data with lower confidence levels) needs to be processed. In addition to using different input data elements with different threshold confidence levels during each pass, different character recognition and word search algorithms may be used. That is, the threshold confidence levels are changed after each pass.

Figure 4:
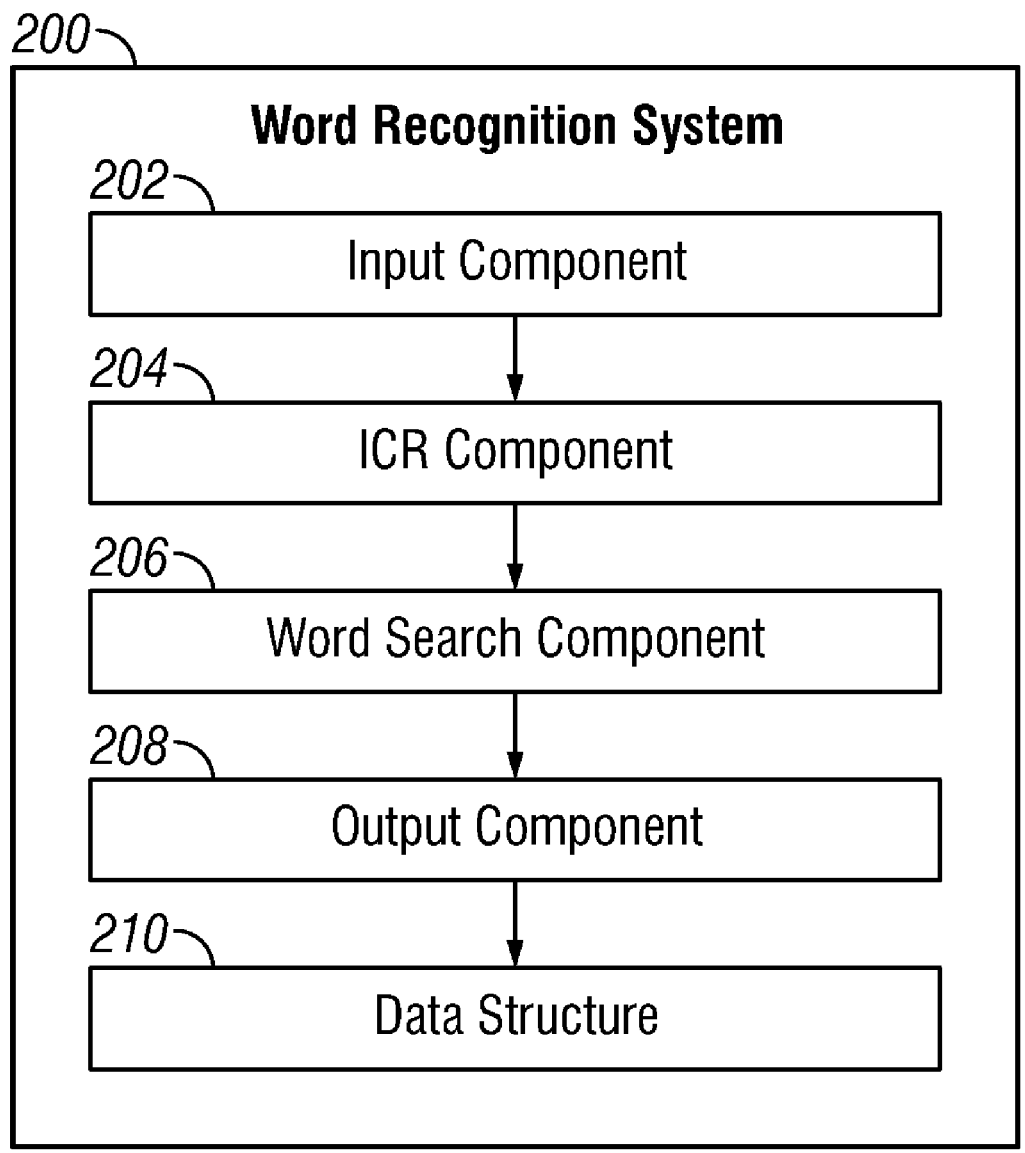
FIG. 4 shows one example of an image processing apparatus that may identify words in a textual image undergoing an OCR process.

FIG. 4 shows one example of an image processing apparatus 200 that may identify words in a textual image undergoing an OCR process. The apparatus 200, which may be incorporated in an OCR engine, includes an input component 202 for receiving an input image having textual lines which have been segmented by chop lines in a previous component of the OCR engine. The apparatus also includes Individual Character Recognition (ICR) component 204 for identifying characters in the textual lines and a word search component 206 for identifying words based on the characters that have been identified by the ICR component. A data structure 210 stores candidate chop lines, candidate characters and candidate words that have been identified by the various components. The apparatus 200 also includes an output component 210 that generates the information concerning the words which have been identified in a form that allows it to be employed by subsequent components of the OCR engine.

Figure 5:
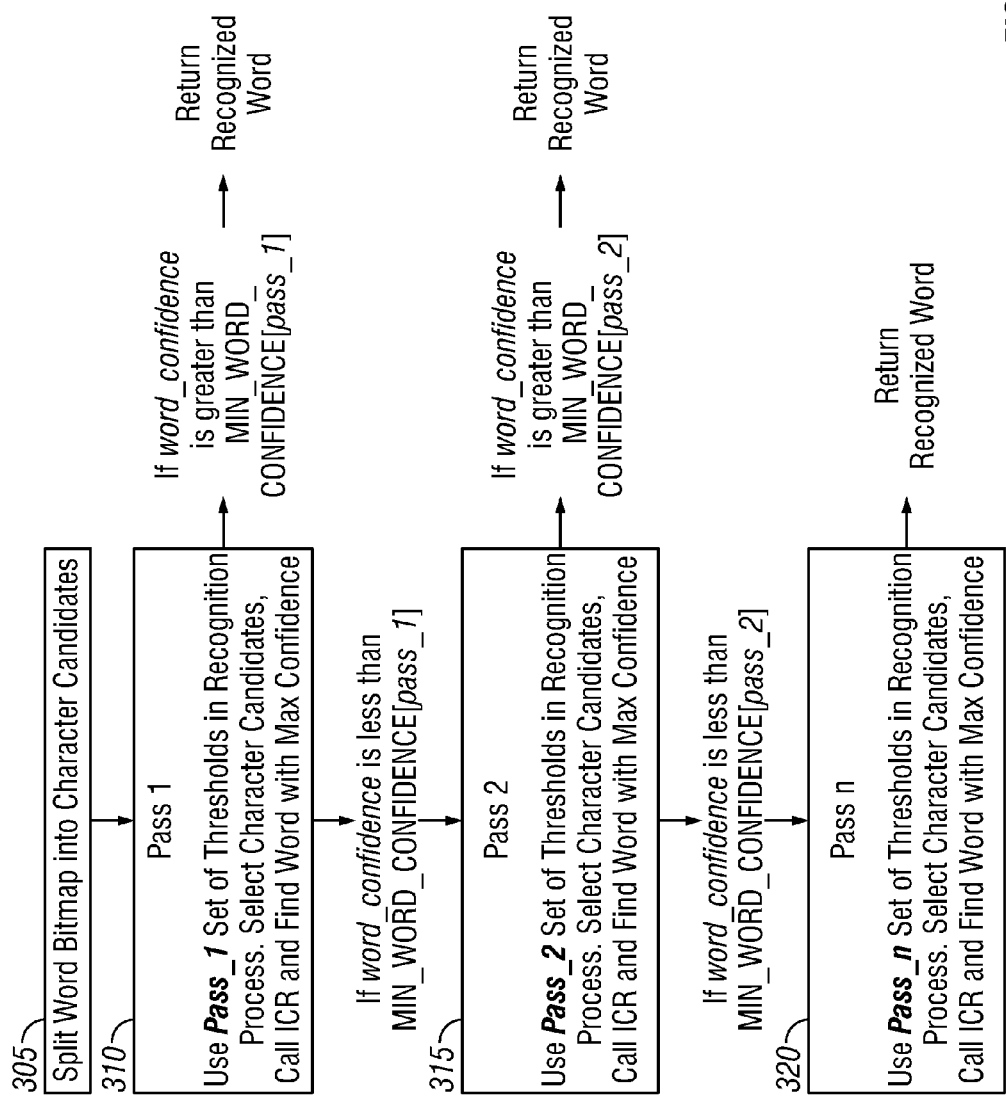
FIG. 5 is a schematic diagram illustrating one example of a word recognition scheme.

The word recognition scheme will be illustrated in connected with the schematic diagram shown in FIG. 5. The word recognition system of the OCR engine first creates a data structure that includes all the input data elements provided by previous components of the engine, including the chop lines and their associated confidence levels, the resulting symbols and a bitmap of the textual image undergoing OCR. This data structure is represented by box 305. The word recognition system receives this data structure and establishes a first set of thresholds for each item in the data structure. For example, thresholds are established for the confidence levels of the chop lines and the resulting candidate characters that are produced using those chop lines. With respect to the chop lines, for instance, a MinSplitLineConfidence(pass_id) is established, where pass_id is the id number of the pass that is being processed.

In the first pass, represented by box 310 in FIG. 5, input data elements are selected from the data structure which satisfies the highest set of thresholds (e.g., the highest confidence levels). In the case of the chop lines, for example, only those chop lines that have a confidence level greater than MinSplitLineConfidence(pass_1) are used. Input data elements that do not satisfy this first set of thresholds is not used in the first pass.

The word recognition system then calls the ICR component, which uses the input data elements that satisfies the first set of thresholds to produce a series of candidate characters along with a confidence level for each one. The candidate characters are then used as input data elements by the word search component to identify a word with a maximum confidence level. If the confidence level of the word exceeds a specified threshold that is established for this first pass (represented by MIN_WORD_CONFIDENCE(PASS_1) in FIG. 5, the word recognition system returns this recognized word to the next appropriate component in the OCR engine. If, on the other hand the confidence level for the word is less than MIN_WORD_CONFIDENCE(PASS_1), the word recognition system performs a second pass.

Before the second pass is performed the candidate characters and recognized words, along with their respective confidence levels, are added to the data structure. In this way they do not have to be recalculated by the ICR component or the word search component during the second or subsequent passes. Accordingly, the data structure contains all the available information that is used to perform word recognition.

In the second pass, represented by box 15 in FIG. 5, input data elements are selected from the data structure which satisfy the second set of thresholds (e.g., the second highest confidence levels). In the case of the chop lines, for example, only those chop lines that have a confidence level greater than MinSplitLineConfidence(pass_2) are used. Input data elements that do not satisfy this second set of thresholds is not used in the second pass.

During the second pass character recognition and word search algorithms may be used that are the same or different from those used in the first pass. For instance, the ICR algorithm that is employed may be represented by ICREngine (pass_id) and thus may differ from one pass to another. In one example, faster or less accurate algorithms may be used during earlier passes (e.g, the first and second passes) while slower and more accurate algorithms may be used in subsequent passes. For instance, in the case of the word search component, algorithms that may be employed include a beam search algorithm or a viterbi algorithm, either with or without the use of dictionary constraints.

If the confidence level of the word exceeds a specified threshold that is established for the second pass (represented by MIN_WORD_CONFIDENCE(PASS_2) in FIG. 5, the word recognition system returns this recognized word to the next appropriate component in the OCR engine. If, on the other hand the confidence level for the word is less than MIN_WORD_CONFIDENCE(PASS_2), the word recognition system performs a third pass. This process continues for additional passes until either the MIN_WORD_CONFIDENCE(PASS_ID) for that pass is exceeded or until a pre-established maximum number of passes have been performed (represented by box 220), which is represented in FIG. 5 by box 320 as pass_n.

The algorithm employed by the ICR component may determine the set or series of candidate characters by examining a wide range of conditions for all possible pairs of chop lines. For instance, only pairs of chop lines may be used in a given pass which were not used in one of the previous passes. In addition, in some cases only chop lines may be used which have a confidence level above MinSplitLineConfidence [pass_id]. Another condition that may be used is the sum of the confidence levels for each chop line located between the pair of chop lines currently being examined. Only chop line pairs are used for which this sum is less than some threshold, referred to as MaxSplitLineSumConfidence[pass_id], which, as the name indicates may vary from pass to pass. Yet another condition that may be used is the percentage of dark pixels located between the pair of chop lines currently being examined. Only chop line pairs are used for which this percentage is greater than some threshold, referred to as MinDarkArea [pass_id], which, as the name indicates may vary from pass to pass.

Figure 6:
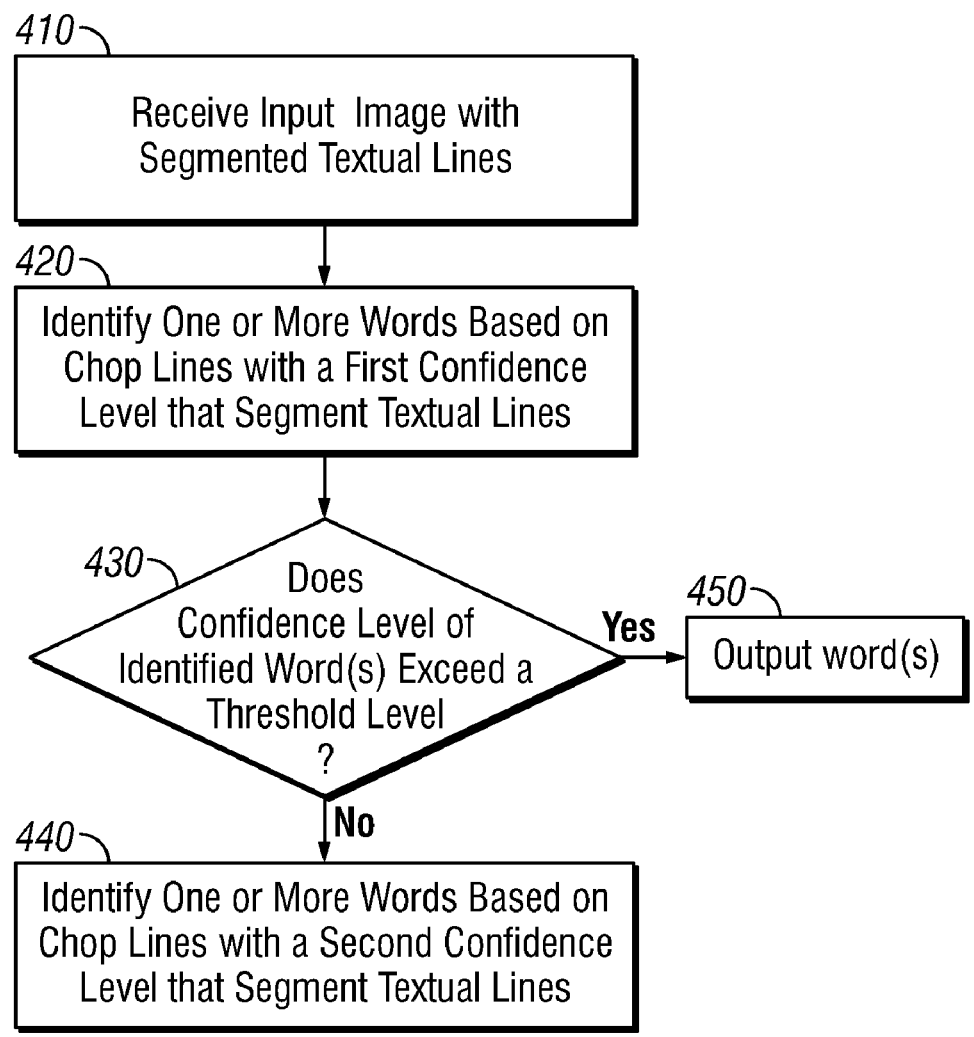
FIG. 6 is a flow chart illustrating one example of a word recognition process.

FIG. 6 is a flowchart illustrated one example of a method for identifying words in a textual image undergoing optical character recognition. In step 410, a bitmap of an input image is received which includes textual lines that have been segmented by a plurality of chop lines that are each associated with a confidence level reflecting a degree to which the respective chop line properly segments the textual line into individual characters. In step 420, one or more words are identified in one of the textual lines based at least in part on the textual lines and a first subset of the plurality of chop lines which have a chop line confidence level above a first threshold value. If at decision step 430 the first word is not associated with a sufficiently high word confidence level, the method proceeds to step 440. In step 440 at least a second word in the textual line is identified based at least in part on a second subset of the plurality of chop lines which have a confidence level above a second threshold value lower than the first threshold value. On the other hand, if at decision step 430 the first word is associated with a sufficiently high word confidence level, the method terminates at step 450, during which the identified words are provided as output data, possibly to another component of the OCR engine or possibly as a digital document such as a PDF or Microsoft Word® document.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for identifying words in a textual image undergoing an OCR process, comprising:
   (a) receiving a bitmap of an input image that includes textual lines that have been segmented by chop lines to define symbols therebetween, wherein each of the chop lines is associated with a chop line confidence level reflecting a degree to which the respective chop line properly segments the textual line into individual characters;
   (b) maintaining a data structure that stores data elements including the bitmap, the chop lines with their respective chop line confidence levels and the symbols;
   (c) producing a first set of candidate characters with character confidence levels associated therewith from a first subset of the data elements in the data structure, the first subset of data elements having respective candidate confidence levels that each exceed a respective one of a first set of data element threshold values;
   (d) updating the data structure by further including the first set of candidate characters with their respective character confidence levels;
   (e) identifying at least a first word from the first set of candidate characters, wherein the first word has a first word confidence level associated therewith;
   (f) if the first word confidence level is below a first word threshold level, updating the data structure to further include the first word and its first word confidence level and
   (g) if the first word confidence level is below a first word threshold level, repeating steps (c)-(e) for a second subset of the data elements in the updated data structure having respective data element confidence levels that each exceed a respective one of a second set of data element threshold values lower than the first set of data element threshold values to thereby produce at least a second word and a second word confidence level associated therewith.

2. The method of claim 1 further comprising repeating steps (c)-(f) for subsequent subsets of data elements in the data structure until a subsequent word with a subsequent word confidence level is produced such that the subsequent word confidence level exceeds a word threshold value that depends in part on a number of times steps (c)-(f) have been repeated.

3. The method of claim 2 wherein each subsequent subset of data elements has a data element threshold value associated therewith that is lower than a data element threshold value associated with any previous subset of data elements.

4. The method of claim 1 further comprising repeating steps (c)-(f) for subsequent subsets of data elements in the data structure until the number of times steps (c)-(f) have been repeated reaches a predetermined maximum number of times.

5. The method of claim 1 wherein producing the first set of candidate characters with candidate confidence levels associated therewith from the first subset of data elements is performed using a first character recognition algorithm and further comprising producing a second set of candidate characters with candidate confidence levels associated therewith from the second subset of data elements using a second character recognition algorithm different from the first character recognition algorithm.

6. The method of claim 5 wherein the first character recognition algorithm is an algorithm that is faster and less accurate than the second character recognition algorithm.

7. The method of claim 1 further comprising identifying the first word using a first word search algorithm and identifying the second word using a second word search algorithm that is different from the first word search algorithm.

8. The method of claim 7 wherein the first word search algorithm is an algorithm that is faster and less accurate than the second word search recognition algorithm.

9. The method of claim 1 further comprising selecting a subset of data elements, wherein selecting the subset of data elements includes selecting pairs of chop lines having additional chop lines located therebetween for which a sum of the respective chop line confidence levels associated with the additional chop lines is less than a predetermined threshold value.

10. The method of claim 9 wherein the predetermined threshold value changes when steps (c)-(e) are repeated.

11. A system for identifying words in a textual image undergoing an OCR process, comprising:
   an input component for receiving a bitmap of an input image that includes text lines that have been segmented by chop lines to define symbols therebetween, wherein a confidence level reflecting chop line accuracy is associated with each chop line;
   a data structure for storing data elements that include the bitmap, the chop lines with their respective chop line confidence levels and the symbols;
   a character recognition component for producing a first set of candidate characters with confidence levels associated therewith from a first subset of the data elements in the data structure having respective confidence levels that each exceed a respective one of a first set of data element threshold values, wherein the character recognition component is configured to cause the data structure to be updated by further including in the data structure the first set of candidate characters with their respective character confidence levels; and
   a word search component for identifying at least a first word from the first set of candidate characters, wherein the first word has a first word confidence level associated therewith, wherein, the word recognition component is configured to cause the data structure to be updated to further include the first word and its first word confidence level if the first word confidence level is below a first word threshold level, wherein the character recognition component and the word search component are further configured to produce, if the first word confidence level is below a first word threshold level, a second set of candidate characters and at least a second word, respectively, from data elements in the updated data structure which have respective confidence levels that each exceed a respective one of a second set of data element threshold values less than the first set of data element threshold values.

12. The system of claim 11 wherein the character recognition component is configured to produce the first set of candidate characters using a first character recognition algorithm and the second set of candidate characters using a second character recognition algorithm different from the first character recognition algorithm.

13. The system of claim 12 wherein the first character recognition algorithm is an algorithm that is faster and less accurate than the second character recognition algorithm.

14. The system of claim 11 wherein the word search component is configured to identify the first word using a first word search algorithm and identifying the second word using a second word search algorithm that is different from the first word search algorithm.

15. A medium storing instructions executable by a computing system, wherein the instructions configure the computing system to perform a method for identifying words in a textual image undergoing optical character recognition, comprising:
   receiving a bitmap of an input image that includes textual lines that have been segmented by a plurality of chop lines that are each associated with a confidence level reflecting a degree to which the respective chop line properly segments the textual line into individual characters;
   identifying at least a first word in one of the textual lines based at least in part on the textual lines and a first subset of the plurality of chop lines which have a chop line confidence level above a first threshold value; and
   if the first word is not associated with a word confidence level exceeding a word confidence threshold, identifying at least a second word in the one textual line based at least in part on a second subset of the plurality of chop lines which have a confidence level above a second threshold value lower than the first threshold value.

16. The medium of claim 15 further comprising producing a first set of candidate characters each associated with a respective one of a first set of candidate confidence levels, wherein the first set of candidate characters is produced from the textual lines and the first subset of the plurality of chop lines.

17. The medium of claim 16 wherein identifying at least the first word includes identifying the first word additionally based at least in part on the first set of candidate characters.

18. The medium of claim 16 wherein, if the first word is not associated with the confidence level exceeding the word confidence threshold, producing a second set of candidate characters each associated with a respective one of a second set of candidate confidence levels, wherein the second set of candidate characters is produced from the textual lines and the second subset of the plurality of chop lines.

19. The medium of claim 18 wherein identifying at least the second word includes identifying the second word additionally based at least in part on the second set of candidate characters.

20. The medium of claim 18 wherein each of the second candidate confidence levels is less than a candidate confidence threshold associated with each of the first set of candidate confidence levels.

* * * * *